United States Patent
Chalmers (10) Patent No.: US 10,247,605 B2
(45) Date of Patent: Apr. 2, 2019

(54) AUTOMATIC REAL-TIME WAVELENGTH CALIBRATION OF FIBER-OPTIC-BASED SPECTROMETERS

(71) Applicant: FILMETRICS, INC., San Diego, CA (US)

(72) Inventor: Scott A. Chalmers, San Diego, CA (US)

(73) Assignee: Filmetrics, Inc., San Diego, CA (US)

( * ) Notice: Subject to any disclaimer, the term of this patent is extended or adjusted under 35 U.S.C. 154(b) by 0 days.

(21) Appl. No.: 13/743,210

(22) Filed: Jan. 16, 2013

(65) Prior Publication Data

US 2013/0250294 A1 Sep. 26, 2013

Related U.S. Application Data

(60) Provisional application No. 61/586,922, filed on Jan. 16, 2012.

(51) Int. Cl.
  *G01J 3/02* (2006.01)
  *G01J 3/10* (2006.01)
  *G01J 3/28* (2006.01)

(52) U.S. Cl.
  CPC ............ *G01J 3/10* (2013.01); *G01J 3/0218* (2013.01); *G01J 3/28* (2013.01); *G01J 2003/2866* (2013.01)

(58) Field of Classification Search
  None
  See application file for complete search history.

(56) References Cited

U.S. PATENT DOCUMENTS

| | | | | |
|---|---|---|---|---|
| 3,973,849 A | * | 8/1976 | Jackson et al. | 356/320 |
| 4,836,674 A | * | 6/1989 | Lequime | A61C 19/10 |
| | | | | 356/319 |
| 5,771,094 A | * | 6/1998 | Carter et al. | 356/326 |
| 5,777,733 A | * | 7/1998 | Radziuk | 356/328 |
| 5,850,623 A | * | 12/1998 | Carman et al. | 702/28 |
| 6,111,650 A | * | 8/2000 | Rawicz | G01J 3/02 |
| | | | | 356/402 |
| 6,384,916 B1 | * | 5/2002 | Furtak | 356/369 |
| 2002/0080353 A1 | * | 6/2002 | Fuhrmann et al. | 356/328 |
| 2005/0018184 A1 | * | 1/2005 | Imura | 356/300 |
| 2007/0195318 A1 | * | 8/2007 | Yamamoto | G01J 3/02 |
| | | | | 356/300 |
| 2011/0295541 A1 | * | 12/2011 | Yu | G01J 3/02 |
| | | | | 702/104 |
| 2012/0120401 A1 | * | 5/2012 | Valsesia | G01N 21/274 |
| | | | | 356/445 |

FOREIGN PATENT DOCUMENTS

WO  WO 2010146160 A1 * 12/2010 ........... G01N 21/274

* cited by examiner

*Primary Examiner* — Dominic J Bologna
(74) *Attorney, Agent, or Firm* — IPR Law Group PC (57) ABSTRACT

A system comprising a calibration light source is described. The system includes a calibration optical fiber coupled to an output of the calibration light source and to an input slit of a spectrometer. The calibration optical fiber transmits light output of the calibration light source to the spectrometer via the slit. An input optical fiber is coupled to the input slit in addition to the calibration optical fiber. The input optical fiber transmits light-under-test to the spectrometer via the slit.

87 Claims, 3 Drawing Sheets

AUTOMATIC REAL-TIME WAVELENGTH CALIBRATION OF FIBER-OPTIC-BASED SPECTROMETERS

RELATED APPLICATION

This application claims the benefit of U.S. Patent Application No. 61/586,922, filed Jan. 16, 2012.

TECHNICAL FIELD

This invention relates generally to the field of optical spectrometers.

BACKGROUND

Compact fiber-optic detector-array-based spectrometers pioneered by H.-E. Korth of IBM Germany and popularized most notably by Ocean Optics, Inc. have found widespread use in a multitude of applications. For example, see "A Computer Integrated Spectrophotometer for Film Thickness Monitoring," H.-E. Korth, IBM Germany, JOURNAL DE PHYSIQUE, Colloque CIO, Supplement Number 12, Tome M, December 1983, pg. C10-101. Because the purpose of a spectrometer is to measure the intensity of light as a function of wavelength, the accuracy of a spectrometer's wavelength calibration is of primary importance. Accurate wavelength calibration relies on consistent mechanical alignment of the spectrometer's several optical components. Alignment of these optical components can be changed by ambient conditions (especially temperature) and by mechanical shock. Typically spectrometer calibration is performed once during manufacture followed in some cases by periodic re-calibration in a laboratory setting. Given the precision required of these devices maintaining sufficient wavelength calibration in the field can be a challenge, especially in portable equipment. In general the only effort by spectrometer manufacturers to actively maintain wavelength calibration is to monitor and adjust for temperature effects based on stored empirical data. Any other significant change to spectrometer calibration in the field is not corrected for and is generally not even detected, which can lead to important undetected errors in their use.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

BRIEF DESCRIPTION OF THE DRAWINGS

The components in the figures are not necessarily to scale, emphasis instead being placed upon illustrating the principles of the embodiments. In the figures, like reference numerals designate corresponding parts throughout the different views.

DETAILED DESCRIPTION

Embodiments described herein provide a method of maintaining accurate real-time spectrometer wavelength calibration. Spectrometer wavelength calibration is generally accomplished by mathematically mapping the spectrometer's output (which typically corresponds to individual detector pixels) to specific wavelengths by using a calibration light source that has stable, known wavelength characteristics. The calibration light source is most often an atomic emission source (e.g., Hg—Ar fluorescent lamp) but can also be one of many other sources, such as a filtered broadband source. Several of the features of known wavelength (emission peaks in the case of fluorescent lamps) are generally measured as a function of the spectrometer's pixel number and these are used to fit a polynomial (e.g., second order polynomial, third order polynomial, etc.) that relates wavelength to pixel number. The coefficients of the calibration polynomial are commonly referred to as "calibration coefficients".

Figure 1:
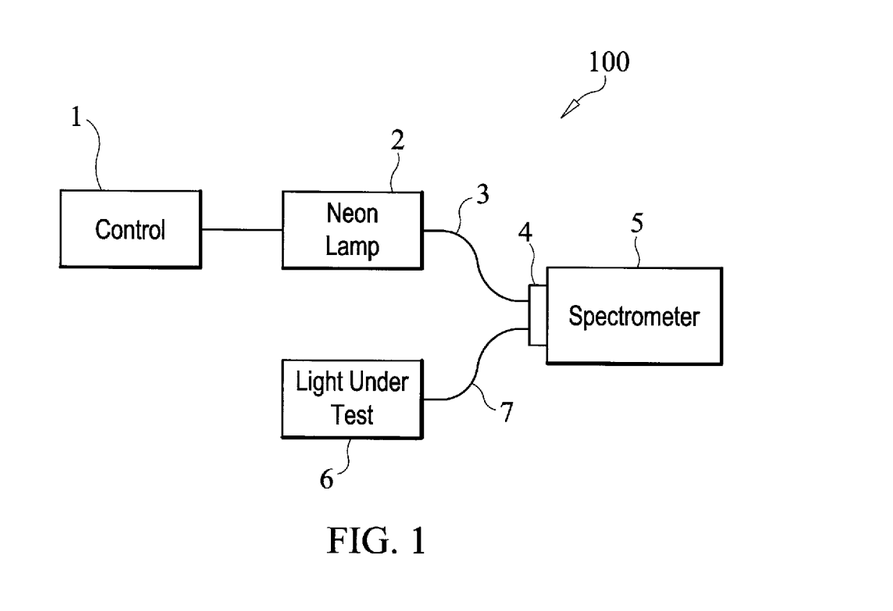
FIG. 1 is a spectrometer calibration system, under an embodiment.

Embodiments herein include an apparatus that injects light from a calibration source into the spectrometer in the field in a practical way, thereby enabling real-time calibration in a low-cost, fast, low-power, and not involve moving parts. As an example, FIG. 1 is a block diagram of a spectrometer system 100 with a spectrometer calibration system that injects light from a calibration source into a spectrometer, under an embodiment. The calibration system generally includes a calibration light source 2, or calibration source 2, coupled between an output of a controller 1 and an input of a spectrometer 5. In this embodiment, a neon lamp 2 is the calibration light source, but the embodiment is not so limited. The calibration light source 2 is controlled (turned on and off) by the controller 1. The output of the calibration light source is collected by a calibration optical fiber 3 and transmitted to an input slit 4 of the spectrometer 5. The spectrometer 5 receives the light that it is to measure 6, referred to herein as the light-under-test 6, via a spectrometer-input optical fiber 7 that is coupled between the light-under-test 6 and the spectrometer 5.

Figure 2:
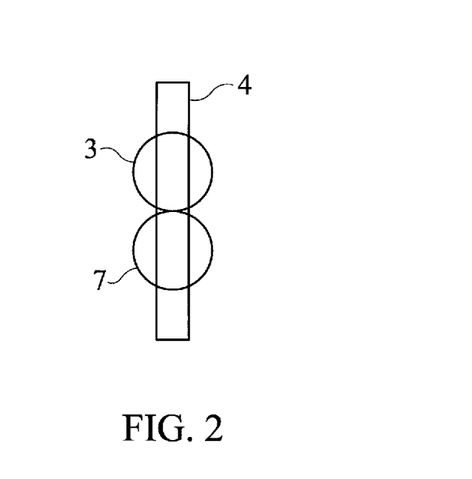
FIG. 2 shows a spectrometer-input optical fiber and a calibration optical fiber arranged to simultaneously direct light into a slit of a fiber-optic spectrometer, under an embodiment.

Embodiments described herein deliver light to the slit with a plurality of fibers, and FIG. 2 shows a spectrometer-input optical fiber and a calibration optical fiber arranged to simultaneously direct light into a slit of a fiber-optic spectrometer, under an embodiment. Slits are used at the input of spectrometers to restrict the lateral width of the light entering the spectrometer and thus improve the spectrometer's wavelength resolution. A view looking toward the input of spectrometer 5 of a spectrometer system 100 shows the cross-section of the calibration optical fiber 3 and spectrometer-input optical fiber 7 in relation to the slit 4. On fiber-optic spectrometers the light is delivered to the slit with an optical fiber, which usually has a diameter in the range of 0.05 mm to 1 mm. Fiber-optic spectrometers are generally sensitive to (i.e., will detect) light impinging upon a considerable length of the slit (usually 1-2 mm). Embodiments described herein deliver light to the slit with a plurality of fibers arranged with their centers approximately aligned along the slit midpoint. The fibers of a spectrometer system 100 are generally in the range of approximately 0.1 mm to 0.3 mm in diameter, but are not so limited, and would thus fit comfortably within the length of the slit to which the spectrometer is sensitive to light.

Figure 3:
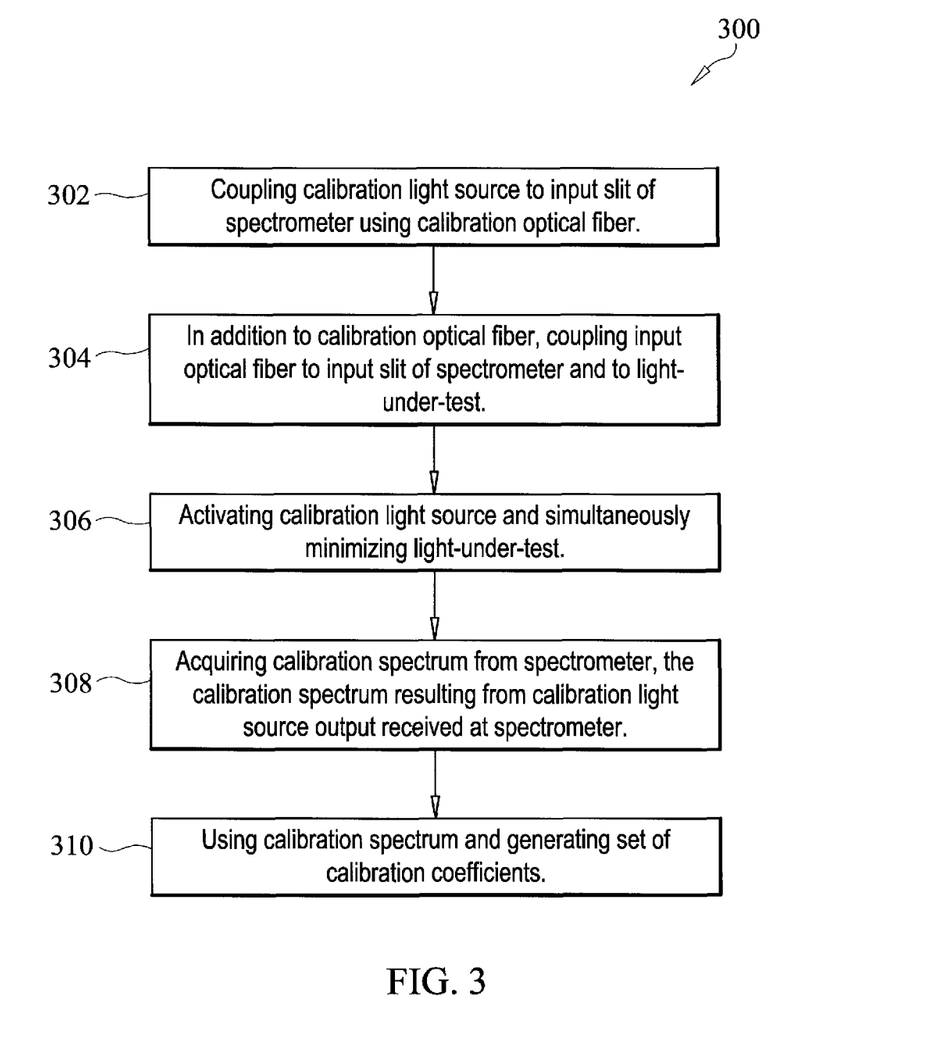
FIG. 3 is a flow diagram for calibrating a spectrometer, under an embodiment.

FIG. 3 is a flow diagram for calibrating a spectrometer 300, under an embodiment. Generally, the spectrometer calibration of an embodiment comprises coupling 302 a calibration light source to an input slit of a spectrometer using a calibration optical fiber. The method includes, in addition to the calibration optical fiber, coupling 304 an input optical fiber to the input slit of the spectrometer. The input optical fiber is coupled to a light-under-test. The method includes activating 306 the calibration light source and simultaneously minimizing the light-under-test. The method includes acquiring 307 a calibration spectrum from the spectrometer. The calibration spectrum results from light output of the calibration light source being received at the spectrometer. Using the calibration spectrum, the method includes generating 310 a set of calibration coefficients.

Operation of the spectrometer system 100 of an embodiment, with reference to FIG. 1, comprises activating the neon lamp 2, acquiring the calibration spectrum from the spectrometer 5, deactivating the neon lamp 2, and analyzing the spectrum to generate a new set of calibration coefficients. The acquisition of the calibration spectrum of an embodiment is performed with the intensity of the light-under-test 6 minimized or zero, but this is not necessary. For example, spectra can be obtained just before and after the acquisition of the calibration spectrum (with the neon lamp deactivated) and these spectra averaged and subtracted from the acquired calibration spectrum. This results in a relatively pure calibration spectrum for analysis, especially if the light-under-test is fairly unchanging. The operation of the spectrometer system 100 as described above does not involve moving parts and can thus be accomplished very quickly, within the time required to acquire as few as one spectra, for example, but is not so limited.

The components of the spectrometer system 100 used for calibration (i.e., the components beyond those of the operating spectrometer system) include the neon lamp 2, the controller 1, and the calibration optical fiber 3. The neon lamp 2 and associated power circuitry, and the controller 1, consume relatively little power (~10 mW) and are relatively inexpensive. The calibration optical fiber 3 of an embodiment is provided as a single assembly along with the spectrometer input optical fiber 7, but is not so limited.

Figure 4:
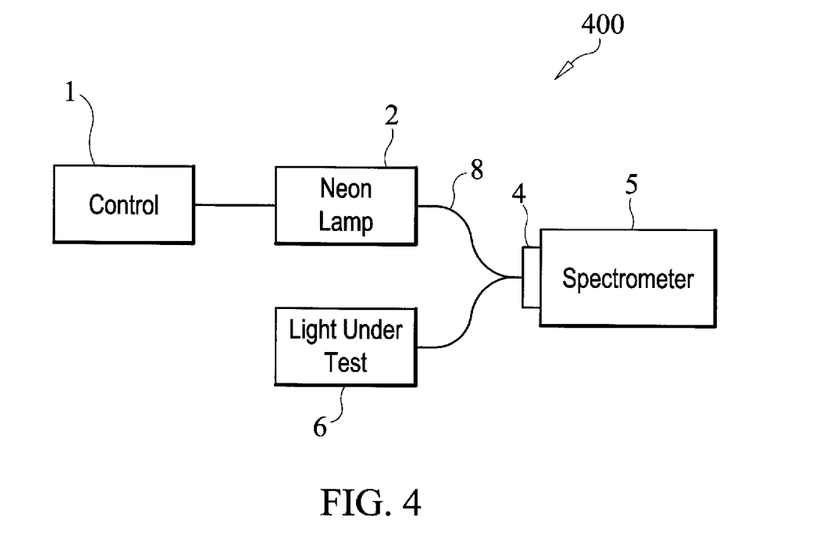
FIG. 4 shows a spectrometer calibration system, under an alternative embodiment.

FIG. 4 shows a spectrometer calibration system 400, under an alternative embodiment. The spectrometer calibration system 400 of this embodiment comprises a calibration light source 2, or calibration source 2, coupled between an output of a controller 1 and an input of a spectrometer 5. In this embodiment, a neon lamp 2 is the calibration light source, but the embodiment is not so limited. The calibration light source 2 is controlled (turned on and off) by the controller 1. However, the spectrometer calibration system 400 of this embodiment, instead of using a calibration optical fiber 3, comprises an off-the-shelf optical-fiber component that collects the output of the calibration light source instead of the custom fiber assembly described above that comprises the calibration optical fiber 3 and spectrometer input optical fiber 7. In this embodiment, the calibration optical fiber 3 and spectrometer input optical fiber 7 are combined into a single fiber using a fiber-optic coupler 8, such as those available from OZ Optics (www.ozoptics.com). The common end of the coupler 8 is connected to the spectrometer slit 4 of the spectrometer 5 as a single fiber. The spectrometer 5 receives the light-under-test 6 and the light of the calibration source 2 via the fiber-optic coupler 8.

Figure 5:
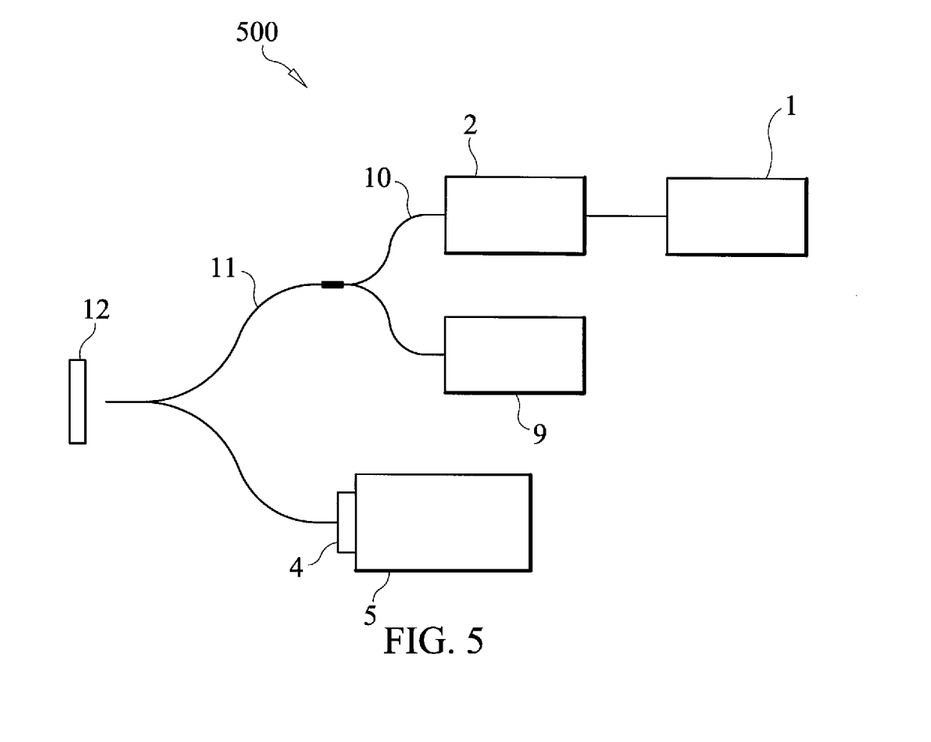
FIG. 5 shows a reflectance measurement system with an integrated spectrometer calibration system, under an embodiment.

FIG. 5 shows a reflectance measurement system 500 with an integrated spectrometer calibration system, under an embodiment. The reflectance measurement system 500 is configured to measure the reflectance of a sample 12, but is not so limited. The reflectance measurement system 500 of this embodiment comprises a calibration light source 2 coupled between an output of a controller 1 and a fiber coupler 10 and reflectance coupler 11. In this embodiment, a neon lamp 2 is the calibration light source, but the embodiment is not so limited. The calibration light source 2 is controlled (turned on and off) by the controller 1. In this embodiment the output of the neon lamp 2 is combined with that of a broadband light source 9 using the fiber coupler 10. The common end of fiber coupler 10 is coupled to the reflectance fiber coupler 11. Light from the neon lamp 2 is delivered through the fiber couplers 10 and 11 to the common end of reflectance coupler 11, where internal reflectance reflects the light back through the reflectance coupler 11 to spectrometer slit 4 and spectrometer 5.

Embodiments described herein include a system comprising a calibration light source. The system includes a calibration optical fiber coupled to the calibration light source and to an input slit of a spectrometer. The calibration optical fiber transmits a first light output of the calibration light source to the spectrometer via the input slit. The system includes an input optical fiber coupled to a test light source and to the input slit. The input optical fiber transmits a second light output of the test light source to the spectrometer via the input slit.

Embodiments described herein include a system comprising: a calibration light source; a calibration optical fiber coupled to the calibration light source and to an input slit of a spectrometer, wherein the calibration optical fiber transmits a first light output of the calibration light source to the spectrometer via the input slit; and an input optical fiber coupled to a test light source and to the input slit, wherein the input optical fiber transmits a second light output of the test light source to the spectrometer via the input slit.

The input slit of an embodiment controls a wavelength resolution of the spectrometer.

The input slit of an embodiment restricts a lateral width of light entering the spectrometer.

A center of the calibration optical fiber of an embodiment is laterally aligned along a midpoint of the input slit.

A center of the input optical fiber of an embodiment is laterally aligned along a midpoint of the input slit.

The calibration optical fiber of an embodiment is positioned adjacent to the input optical fiber.

A center of the calibration optical fiber of an embodiment is laterally aligned along a midpoint of the input slit, and a center of the input optical fiber is laterally aligned along a midpoint of the input slit.

The calibration optical fiber of an embodiment is positioned adjacent to the input optical fiber.

A fiber optic coupler of an embodiment, wherein a first segment of the fiber optic coupler includes the calibration optical fiber, wherein a second segment of the fiber optic coupler includes the input optical fiber.

The fiber optic coupler of an embodiment is a single fiber.

The fiber optic coupler of an embodiment comprises an output segment coupled to the first segment and the second segment, wherein the output segment is coupled to the input slit of the spectrometer.

The first segment of the fiber optic coupler of an embodiment transmits the first light output of the calibration light source to the spectrometer via the slit, and the second segment of the fiber optic coupler transmits the second light output of the test light source to the spectrometer via the slit.

The system of an embodiment comprises a reflectance fiber coupler, wherein a first end of the reflectance fiber coupler is coupled to the output segment of the fiber optic coupler, and a second end of the reflectance fiber coupler is coupled to the input slit of the spectrometer.

The reflectance fiber coupler comprises a third end positioned adjacent to a sample.

The third end of the reflectance fiber coupler at least one of emits light for illuminating the sample and collects light reflected from the sample.

The system of an embodiment comprises a controller coupled to the calibration light source and controlling a state of the calibration light source.

The calibration light source comprises an atomic emission source.

The calibration light source comprises a broadband source.

The calibration light source comprises a neon lamp.

The calibration light source comprises a fluorescent lamp.

The first light output of the calibration light source is activated and the second light output of the test light source is minimized nearly simultaneously.

A calibration spectrum is generated at the spectrometer in response to receipt of the first light output of the calibration light source at the spectrometer.

A set of calibration coefficients is generated using the calibration spectrum.

The spectrometer is calibrated with the set of calibration coefficients.

Embodiments described herein include a system comprising a calibration light source. The system includes a calibration optical fiber coupled to the calibration light source and to an input slit of a spectrometer. The system includes a test light source separate from the calibration light source. The system includes an input optical fiber coupled to a test light source and to the input slit.

Embodiments described herein include a system comprising: a calibration light source; a calibration optical fiber coupled to the calibration light source and to an input slit of a spectrometer; a test light source separate from the calibration light source; and an input optical fiber coupled to a test light source and to the input slit.

Embodiments described herein include a system comprising a calibration light source. The system includes a calibration optical fiber coupled to the calibration light source and to an input slit of a spectrometer. The calibration optical fiber transmits an output of the calibration light source to the spectrometer via the input slit. An additional optical fiber is coupled to the input slit in addition to the calibration optical fiber.

Embodiments described herein include a system comprising: a calibration light source; and a calibration optical fiber coupled to the calibration light source and to an input slit of a spectrometer, wherein the calibration optical fiber transmits an output of the calibration light source to the spectrometer via the input slit, wherein an additional optical fiber is coupled to the input slit in addition to the calibration optical fiber.

Embodiments described herein include a system comprising a calibration light source coupled to a controller. The controller controls a state of the calibration light source. The system includes a calibration optical fiber coupled to the calibration light source and to an input slit of a spectrometer. The calibration optical fiber transmits a first light output of the calibration light source to the spectrometer via the input slit. An input optical fiber is coupled to the input slit in addition to the calibration optical fiber.

Embodiments described herein include a system comprising: a calibration light source coupled to a controller, wherein the controller controls a state of the calibration light source; and a calibration optical fiber coupled to the calibration light source and to an input slit of a spectrometer, wherein the calibration optical fiber transmits a first light output of the calibration light source to the spectrometer via the input slit, wherein an input optical fiber is coupled to the input slit in addition to the calibration optical fiber.

Embodiments described herein include a system comprising a calibration light source. The system includes an optical fiber assembly comprising a first segment having a first input coupled to an output of the calibration light source, a second segment having a second input coupled to a test light source, and an output segment coupled to the first segment and the second segment. The output segment is coupled to an input slit of a spectrometer. The first segment of the optical fiber assembly transmits light output of the calibration light source to the spectrometer via the output segment and the input slit, and the second segment transmits light output of the test light source to the spectrometer via the output segment and the input slit.

Embodiments described herein include a system comprising: a calibration light source; and an optical fiber assembly comprising a first segment having a first input coupled to an output of the calibration light source, a second segment having a second input coupled to a test light source, and an output segment coupled to the first segment and the second segment, wherein the output segment is coupled to an input slit of a spectrometer; wherein the first segment of the optical fiber assembly transmits light output of the calibration light source to the spectrometer via the output segment and the input slit, and the second segment transmits light output of the test light source to the spectrometer via the output segment and the input slit.

The input slit of an embodiment controls a wavelength resolution of the spectrometer.

The input slit of an embodiment restricts a lateral width of light entering the spectrometer.

A center of the output segment of the optical fiber assembly of an embodiment is laterally aligned along a midpoint of the input slit.

The optical fiber assembly of an embodiment is a single fiber coupler.

The system of an embodiment comprises a controller coupled to the calibration light source and controlling a state of the calibration light source.

The calibration light source of an embodiment comprises an atomic emission source.

The calibration light source of an embodiment comprises a broadband source.

The calibration light source of an embodiment comprises a neon lamp.

The calibration light source of an embodiment comprises a fluorescent lamp.

The light output of the calibration light source of an embodiment is activated and the light output of the test light source is minimized nearly simultaneously.

A calibration spectrum of an embodiment is generated at the spectrometer in response to receipt of the light output of the calibration light source at the spectrometer.

A set of calibration coefficients of an embodiment is generated using the calibration spectrum.

The spectrometer of an embodiment is calibrated with the set of calibration coefficients.

The system of an embodiment comprises a reflectance fiber coupler, wherein a first end of the reflectance fiber coupler is coupled to the output segment of the optical fiber assembly, and a second end of the reflectance fiber coupler is coupled to the input slit of the spectrometer.

The reflectance fiber coupler of an embodiment comprises a third end positioned adjacent to a sample.

The third end of the reflectance fiber coupler of an embodiment at least one of emits light for illuminating the sample and collects light reflected from the sample.

Embodiments described herein include a system comprising a calibration light source. The system includes an optical fiber assembly comprising a first segment having a first input coupled to an output of the calibration light source, a second segment having a second input coupled to a test light source, and an output segment coupled to the first segment and the second segment. The system includes a reflectance fiber coupler. A first end of the reflectance fiber coupler is coupled to the output segment of the optical fiber assembly. A second end of the reflectance fiber coupler is coupled to the input slit of the spectrometer.

Embodiments described herein include a system comprising: a calibration light source; an optical fiber assembly comprising a first segment having a first input coupled to an output of the calibration light source, a second segment having a second input coupled to a test light source, and an output segment coupled to the first segment and the second segment; a reflectance fiber coupler, wherein a first end of the reflectance fiber coupler is coupled to the output segment of the optical fiber assembly, and a second end of the reflectance fiber coupler is coupled to the input slit of the spectrometer.

The optical fiber assembly of an embodiment is a single fiber.

The system of an embodiment includes a controller coupled to the calibration light source and controls a state of the calibration light source.

The first light output of the calibration light source of an embodiment is activated and the second light output of the test light source is minimized nearly simultaneously.

A calibration spectrum of an embodiment is generated at the spectrometer in response to receipt of the first light output of the calibration light source at the spectrometer.

A set of calibration coefficients of an embodiment is generated using the calibration spectrum.

The spectrometer of an embodiment is calibrated with the set of calibration coefficients.

The reflectance fiber coupler of an embodiment comprises a third end positioned adjacent to a sample.

The third end of the reflectance fiber coupler of an embodiment at least one of emits light for illuminating the sample and collects light reflected from the sample.

Embodiments described herein include a method comprising coupling a calibration light source to an input slit of a spectrometer using a calibration optical fiber. The method includes coupling a test light source to the input slit of the spectrometer using an input optical fiber. The input optical fiber is coupled to the input slit in addition to the calibration optical fiber.

Embodiments described herein include a method comprising: coupling a calibration light source to an input slit of a spectrometer using a calibration optical fiber; and coupling a test light source to the input slit of the spectrometer using an input optical fiber, wherein the input optical fiber is coupled to the input slit in addition to the calibration optical fiber.

The method of an embodiment comprises transmitting a first light output of the calibration light source and a second light output of the test light source to the spectrometer via the input slit.

The method of an embodiment comprises using the input slit to control a wavelength resolution of the spectrometer.

The method of an embodiment comprises using the input slit to restrict a lateral width of light entering the spectrometer.

The method of an embodiment comprises laterally aligning a center of the calibration optical fiber along a midpoint of the input slit.

The method of an embodiment comprises laterally aligning a center of the input optical fiber along a midpoint of the input slit.

The method of an embodiment comprises positioning the calibration optical fiber adjacent to the input optical fiber.

The method of an embodiment comprises laterally aligning a center of the calibration optical fiber along a midpoint of the input slit, and laterally aligning a center of the input optical fiber aligned along a midpoint of the input slit.

The method of an embodiment comprises positioning the calibration optical fiber adjacent to the input optical fiber.

The method of an embodiment comprises coupling a fiber optic coupler to the input slit of the spectrometer, the calibration light source, and the test light source.

The fiber optic coupler of an embodiment comprises a single fiber.

A first segment of the fiber optic coupler of an embodiment includes the calibration optical fiber, and a second segment of the fiber optic coupler includes the input optical fiber.

The method of an embodiment comprises coupling an output segment of the fiber optic coupler to the input slit of the spectrometer, wherein the output segment is coupled to the first segment and the second segment.

The method of an embodiment comprises using the first segment of the fiber optic coupler to transmit the first light output of the calibration light source to the spectrometer via the output segment and the slit, and using the second segment of the fiber optic coupler to transmit the second light output of the test light source to the spectrometer via the output segment and the slit.

The method of an embodiment comprises coupling a reflectance fiber coupler to the output segment of the fiber optic coupler and to the input slit of the spectrometer.

The method of an embodiment comprises coupling a first end of the reflectance fiber coupler to the output segment of the fiber optic coupler, and coupling a second end of the reflectance fiber coupler to the input slit of the spectrometer.

The method of an embodiment comprises positioning a third end of the reflectance fiber coupler adjacent to a sample.

The method of an embodiment comprises at least one of emitting light for illuminating the sample and collecting light reflected from the sample via the third end of the reflectance fiber coupler.

The method of an embodiment comprises coupling a controller coupled to the calibration light source and controlling a state of the calibration light source using the controller.

The calibration light source of an embodiment comprises an atomic emission source.

The calibration light source of an embodiment comprises a broadband source.

The calibration light source of an embodiment comprises a neon lamp.

The calibration light source of an embodiment comprises a fluorescent lamp.

The method of an embodiment comprises controlling a state of the first light output of the calibration light source and the second light output of the test light source nearly simultaneously.

The controlling of an embodiment comprises activating the first light output of the calibration light source.

The controlling of an embodiment comprises minimizing the second light output of the test light source.

The controlling of an embodiment comprises deactivating the first light output of the calibration light source.

The method of an embodiment comprises generating a calibration spectrum at the spectrometer using the first light output of the calibration light source received at the spectrometer.

The method of an embodiment comprises generating a set of calibration coefficients using the calibration spectrum.

The method of an embodiment comprises calibrating the spectrometer using the set of calibration coefficients.

Embodiments described herein include a method comprising coupling a calibration light source to an input slit of a spectrometer using a calibration optical fiber. The method includes coupling a input optical fiber to the input slit of the spectrometer. The input optical fiber is coupled to a test light source. The method includes activating the calibration light source and simultaneously minimizing the light-under-test; acquiring a calibration spectrum from the spectrometer. The calibration spectrum results from light output of the calibration light source being received at the spectrometer. The method includes using the calibration spectrum, generating a set of calibration coefficients.

Embodiments described herein include a method comprising: coupling a calibration light source to an input slit of a spectrometer using a calibration optical fiber; coupling an input optical fiber to the input slit of the spectrometer, wherein the input optical fiber is coupled to a test light source; activating the calibration light source and simultaneously minimizing the light-under-test; acquiring a calibration spectrum from the spectrometer, the calibration spectrum resulting from light output of the calibration light source being received at the spectrometer; and using the calibration spectrum, generating a set of calibration coefficients.

Embodiments described herein include a method comprising coupling a calibration light source to an input slit of a spectrometer using a first input segment of an optical fiber assembly. The method includes coupling a test light source to the input slit of the spectrometer using a second input segment of the optical fiber assembly. The method includes coupling an output segment of the optical fiber assembly to the input slit of the spectrometer. The output segment is coupled to the first input segment and the second input segment. The method includes calibrating the spectrometer using information of first light output of the calibration light source and second light output of the test light source.

Embodiments described herein include a method comprising: coupling a calibration light source to an input slit of a spectrometer using a first input segment of an optical fiber assembly; coupling a test light source to the input slit of the spectrometer using a second input segment of the optical fiber assembly; coupling an output segment of the optical fiber assembly to the input slit of the spectrometer, wherein the output segment is coupled to the first input segment and the second input segment; and calibrating the spectrometer using information of first light output of the calibration light source and second light output of the test light source.

The method of an embodiment comprises transmitting the first light output of the calibration light source and a second light output of the test light source to the spectrometer via the input slit.

The method of an embodiment comprises using the input slit to control a wavelength resolution of the spectrometer.

The method of an embodiment comprises using the input slit to restrict a lateral width of light entering the spectrometer.

The method of an embodiment comprises laterally aligning a center of the optical fiber along a midpoint of the input slit.

The optical fiber of an embodiment comprises a single fiber.

The method of an embodiment comprises coupling a controller coupled to the calibration light source and controlling a state of the calibration light source using the controller.

The calibration light source of an embodiment comprises an atomic emission source.

The calibration light source of an embodiment comprises a broadband source.

The calibration light source of an embodiment comprises a neon lamp.

The calibration light source of an embodiment comprises a fluorescent lamp.

The method of an embodiment comprises controlling a state of a first light output of the calibration light source and a second light output of the test light source nearly simultaneously.

The controlling of an embodiment comprises activating the first light output of the calibration light source.

The controlling of an embodiment comprises minimizing the second light output of the test light source.

The controlling of an embodiment comprises deactivating the first light output of the calibration light source.

The method of an embodiment comprises generating a calibration spectrum at the spectrometer using the first light output of the calibration light source received at the spectrometer.

The method of an embodiment comprises generating a set of calibration coefficients using the calibration spectrum.

The method of an embodiment comprises calibrating the spectrometer using the set of calibration coefficients.

The method of an embodiment comprises coupling a reflectance fiber coupler to the output segment of the optical fiber assembly and to the input slit of the spectrometer.

The method of an embodiment comprises coupling a first end of the reflectance fiber coupler to the output segment of the optical fiber assembly, and coupling a second end of the reflectance fiber coupler to the input slit of the spectrometer.

The method of an embodiment comprises positioning a third end of the reflectance fiber coupler adjacent to a sample.

The method of an embodiment comprises at least one of emitting light for illuminating the sample and collecting light reflected from the sample via the third end of the reflectance fiber coupler.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the spectrometer systems and methods is not intended to be exhaustive or to limit the systems and methods described to the precise form disclosed. While specific embodiments of, and examples for, the spectrometer systems and methods are described herein for illustrative purposes, various equivalent modifications are possible within the scope of other spectrometer systems and methods, as those skilled in the relevant art will recognize. The teachings of the spectrometer systems and methods provided herein can be applied to other processing and measurement systems and methods, not only for the systems and methods described above.

The elements and acts of the various embodiments described above can be combined to provide further embodiments. These and other changes can be made to the spectrometer systems and methods in light of the above detailed description.

In general, in the following claims, the terms used should not be construed to limit the spectrometer systems and methods to the specific embodiments disclosed in the specification and the claims, but should be construed to include all systems and methods that operate under the claims. Accordingly, the spectrometer systems and methods are not limited by the disclosure, but instead the scope of the spectrometer systems and methods is to be determined entirely by the claims.

While certain aspects of the spectrometer systems and methods are presented below in certain claim forms, the inventors contemplate the various aspects of the spectrometer systems and methods in any number of claim forms. Accordingly, the inventors reserve the right to add additional claims after filing the application to pursue such additional claim forms for other aspects of the spectrometer systems and methods.

What is claimed is:

1. A system comprising:
a calibration light source;
a calibration optical fiber connected to the calibration light source and to an input slit of a spectrometer, wherein the calibration optical fiber transmits a first light output of the calibration light source to the spectrometer via the input slit; and
an input optical fiber connected to a test light source and to the input slit, wherein the input optical fiber transmits a second light output of the test light source to the spectrometer via the input slit, wherein the calibration light source and the test light source are each separately controlled to simultaneously direct light into the input slit.

2. The system of claim 1, wherein the input slit controls a wavelength resolution of the spectrometer.

3. The system of claim 1, wherein the input slit restricts a lateral width of light entering the spectrometer.

4. The system of claim 1, wherein a center of the calibration optical fiber is laterally aligned along a midpoint of the input slit.

5. The system of claim 1, wherein a center of the input optical fiber is laterally aligned along a midpoint of the input slit.

6. The system of claim 1, wherein the calibration optical fiber is positioned adjacent to the input optical fiber.

7. The system of claim 1, wherein a center of the calibration optical fiber is laterally aligned along a midpoint of the input slit, and a center of the input optical fiber is laterally aligned along a midpoint of the input slit.

8. The system of claim 7, wherein the calibration optical fiber is positioned adjacent to the input optical fiber.

9. The system of claim 1, comprising a fiber optic coupler, wherein a first segment of the fiber optic coupler includes the calibration optical fiber, wherein a second segment of the fiber optic coupler includes the input optical fiber.

10. The system of claim 9, wherein the fiber optic coupler is a single fiber.

11. The system of claim 9, wherein the fiber optic coupler comprises an output segment coupled to the first segment and the second segment, wherein the output segment is coupled to the input slit of the spectrometer.

12. The system of claim 11, wherein the first segment of the fiber optic coupler transmits the first light output of the calibration light source to the spectrometer via the slit, and the second segment of the fiber optic coupler transmits the second light output of the test light source to the spectrometer via the slit.

13. The system of claim 11, comprising a reflectance fiber coupler, wherein a first end of the reflectance fiber coupler is coupled to the output segment of the fiber optic coupler, and a second end of the reflectance fiber coupler is coupled to the input slit of the spectrometer.

14. The system of claim 13, wherein the reflectance fiber coupler comprises a third end positioned adjacent to a sample.

15. The system of claim 14, wherein the third end of the reflectance fiber coupler at least one of emits light for illuminating the sample and collects light reflected from the sample.

16. The system of claim 1, comprising a controller coupled to the calibration light source and controlling a state of the calibration light source.

17. The system of claim 1, wherein the calibration light source comprises an atomic emission source.

18. The system of claim 1, wherein the calibration light source comprises a broadband source.

19. The system of claim 1, wherein the calibration light source comprises a neon lamp.

20. The system of claim 1, wherein the calibration light source comprises a fluorescent lamp.

21. The system of claim 1, wherein the system is configured to nearly simultaneously activate the first light output of the calibration light source and minimize the second light output of the test light source.

22. The system of claim 21, wherein the system is configured to generate a calibration spectrum at the spectrometer in response to receipt of the first light output of the calibration light source at the spectrometer.

23. The system of claim 22, wherein the system is configured to generate a set of calibration coefficients using the calibration spectrum.

24. The system of claim 23, wherein the spectrometer is configured to be calibrated with the set of calibration coefficients.

25. A system comprising:
a calibration light source;
a calibration optical fiber connected to the calibration light source and to an input slit of a spectrometer;
a test light source separate from the calibration light source; and
an input optical fiber connected to the test light source and to the input slit, wherein the calibration light source and the test light source are each separately controlled to simultaneously direct light into the input slit.

26. A system comprising:
a calibration light source; and
a calibration optical fiber connected to the calibration light source and to an input slit of a spectrometer, wherein the calibration optical fiber transmits an output of the calibration light source to the spectrometer via the input slit, wherein an additional optical fiber is connected to the input slit in addition to the calibration optical fiber, wherein the calibration optical fiber and the additional optical fiber are configured to simultaneously direct light from separate light sources into the input slit.

27. A system comprising:
a calibration light source coupled to a controller, wherein the controller controls a state of the calibration light source; and
a calibration optical fiber connected to the calibration light source and to an input slit of a spectrometer, wherein the calibration optical fiber transmits a first light output of the calibration light source to the spectrometer via the input slit, wherein an input optical fiber is coupled to the input slit in addition to the calibration optical fiber, wherein the calibration optical fiber and the input optical fiber are configured to simultaneously direct light from separate light sources into the input slit.

28. A system comprising:
a calibration light source; and
an optical fiber assembly comprising a first segment having a first input coupled to an output of the calibration light source, a second segment having a second input coupled to a test light source, and an output segment coupled to the first segment and the second segment, wherein the output segment is coupled to an input slit of a spectrometer;
wherein the first segment of the optical fiber assembly transmits light output of the calibration light source to the spectrometer via the output segment and the input slit, and the second segment transmits light output of the test light source to the spectrometer via the output segment and the input slit, wherein the calibration light source and the test light source are each separately controlled to simultaneously direct light into the input slit via the output segment.

29. The system of claim 28, wherein a center of the output segment of the optical fiber assembly is laterally aligned along a midpoint of the input slit.

30. The system of claim 28, wherein the optical fiber assembly is a single fiber coupler.

31. The system of claim 28, comprising a controller coupled to the calibration light source and controlling a state of the calibration light source.

32. The system of claim 28, wherein the calibration light source comprises at least one of an atomic emission source, a broadband source, a neon lamp, and a fluorescent lamp.

33. The system of claim 28, wherein the system is configured to nearly simultaneously activate the light output of the calibration light source and minimize the light output of the test light source.

34. The system of claim 33, wherein the system is configured to generate a calibration spectrum at the spectrometer in response to receipt of the light output of the calibration light source at the spectrometer.

35. The system of claim 34, wherein the system is configured to generate a set of calibration coefficients using the calibration spectrum.

36. The system of claim 35, wherein the spectrometer is configured to be calibrated with the set of calibration coefficients.

37. The system of claim 28, comprising a reflectance fiber coupler, wherein a first end of the reflectance fiber coupler is coupled to the output segment of the optical fiber assembly, and a second end of the reflectance fiber coupler is coupled to the input slit of the spectrometer.

38. The system of claim 37, wherein the reflectance fiber coupler comprises a third end positioned adjacent to a sample.

39. The system of claim 38, wherein the third end of the reflectance fiber coupler at least one of emits light for illuminating the sample and collects light reflected from the sample.

40. A method comprising:
connecting a calibration light source to an input slit of a spectrometer using a calibration optical fiber;
connecting a test light source to the input slit of the spectrometer using an input optical fiber, wherein the input optical fiber is connected to the input slit in addition to the calibration optical fiber; and
separately controlling each of the calibration light source and the test light source to simultaneously direct light into the input slit.

41. The method of claim 40, comprising transmitting a first light output of the calibration light source and a second light output of the test light source to the spectrometer via the input slit.

42. The method of claim 40, comprising using the input slit to control a wavelength resolution of the spectrometer.

43. The method of claim 40, comprising using the input slit to restrict a lateral width of light entering the spectrometer.

44. The method of claim 40, comprising laterally aligning a center of the calibration optical fiber along a midpoint of the input slit.

45. The method of claim 40, comprising laterally aligning a center of the input optical fiber along a midpoint of the input slit.

46. The method of claim 40, comprising positioning the calibration optical fiber adjacent to the input optical fiber.

47. The method of claim 40, comprising laterally aligning a center of the calibration optical fiber along a midpoint of the input slit, and laterally aligning a center of the input optical fiber aligned along a midpoint of the input slit.

48. The method of claim 47, comprising positioning the calibration optical fiber adjacent to the input optical fiber.

49. The method of claim 40, comprising coupling a fiber optic coupler to the input slit of the spectrometer, the calibration light source, and the test light source.

50. The method of claim 49, wherein the fiber optic coupler comprises a single fiber.

51. The method of claim 49, wherein a first segment of the fiber optic coupler includes the calibration optical fiber, and a second segment of the fiber optic coupler includes the input optical fiber.

52. The method of claim 49, comprising coupling an output segment of the fiber optic coupler to the input slit of the spectrometer, wherein the output segment is coupled to the first segment and the second segment.

53. The method of claim 52, comprising using the first segment of the fiber optic coupler to transmit the first light output of the calibration light source to the spectrometer via the output segment and the slit, and using the second segment of the fiber optic coupler to transmit the second light output of the test light source to the spectrometer via the output segment and the slit.

54. The method of claim 52, comprising coupling a reflectance fiber coupler to the output segment of the fiber optic coupler and to the input slit of the spectrometer.

55. The method of claim 54, comprising coupling a first end of the reflectance fiber coupler to the output segment of the fiber optic coupler, and coupling a second end of the reflectance fiber coupler to the input slit of the spectrometer.

56. The method of claim 55, comprising positioning a third end of the reflectance fiber coupler adjacent to a sample.

57. The method of claim 56, at least one of emitting light for illuminating the sample and collecting light reflected from the sample via the third end of the reflectance fiber coupler.

58. The method of claim 40, comprising coupling a controller coupled to the calibration light source and controlling a state of the calibration light source using the controller.

59. The method of claim 40, wherein the calibration light source comprises an atomic emission source.

60. The method of claim 40, wherein the calibration light source comprises a broadband source.

61. The method of claim 40, wherein the calibration light source comprises a neon lamp.

62. The method of claim 40, wherein the calibration light source comprises a fluorescent lamp.

63. The method of claim 40, comprising controlling a state of the first light output of the calibration light source and the second light output of the test light source nearly simultaneously.

64. The method of claim 63, wherein the controlling comprises activating the first light output of the calibration light source.

65. The method of claim 64, wherein the controlling comprises minimizing the second light output of the test light source.

66. The method of claim 64, wherein the controlling comprises deactivating the first light output of the calibration light source.

67. The method of claim 63, comprising generating a calibration spectrum at the spectrometer using the first light output of the calibration light source received at the spectrometer.

68. The method of claim 67, comprising generating a set of calibration coefficients using the calibration spectrum.

69. The method of claim 68, comprising calibrating the spectrometer using the set of calibration coefficients.

70. A method comprising:
connecting a calibration light source to an input slit of a spectrometer using a calibration optical fiber;
connecting an input optical fiber to the input slit of the spectrometer, wherein the input optical fiber is coupled to a test light source, wherein the calibration light source and the test light source are configured to simultaneously direct light into the input slit;
separately controlling each of the calibration light source and the test light source by activating the calibration light source and minimizing the light-under-test;
acquiring a calibration spectrum from the spectrometer, the calibration spectrum resulting from light output of the calibration light source being received at the spectrometer; and
using the calibration spectrum, generating a set of calibration coefficients.

71. A method comprising:
connecting a calibration light source to an input slit of a spectrometer using a first input segment of an optical fiber assembly;
connecting a test light source to the input slit of the spectrometer using a second input segment of the optical fiber assembly;
coupling an output segment of the optical fiber assembly to the input slit of the spectrometer, wherein the output segment is coupled to the first input segment and the second input segment, wherein the calibration light source and the test light source are each separately controlled to simultaneously direct light into the input slit via the output segment; and
calibrating the spectrometer using information of first light output of the calibration light source and second light output of the test light source.

72. The method of claim 71, comprising transmitting the first light output of the calibration light source and a second light output of the test light source to the spectrometer via the input slit.

73. The method of claim 71, comprising laterally aligning a center of the optical fiber along a midpoint of the input slit.

74. The method of claim 71, wherein the optical fiber assembly comprises a single fiber.

75. The method of claim 71, comprising coupling a controller coupled to the calibration light source and controlling a state of the calibration light source using the controller.

76. The method of claim 71, wherein the calibration light source comprises at least one of an atomic emission source, a broadband source, a neon lamp, and a fluorescent lamp.

77. The method of claim 71, comprising controlling a state of a first light output of the calibration light source and a second light output of the test light source nearly simultaneously.

78. The method of claim 77, wherein the controlling comprises activating the first light output of the calibration light source.

79. The method of claim 78, wherein the controlling comprises minimizing the second light output of the test light source.

80. The method of claim 78, wherein the controlling comprises deactivating the first light output of the calibration light source.

81. The method of claim 77, comprising generating a calibration spectrum at the spectrometer using the first light output of the calibration light source received at the spectrometer.

82. The method of claim 81, comprising generating a set of calibration coefficients using the calibration spectrum.

83. The method of claim 82, comprising calibrating the spectrometer using the set of calibration coefficients.

84. The method of claim 71, comprising coupling a reflectance fiber coupler to the output segment of the optical fiber assembly and to the input slit of the spectrometer.

85. The method of claim 84, comprising coupling a first end of the reflectance fiber coupler to the output segment of the optical fiber assembly, and coupling a second end of the reflectance fiber coupler to the input slit of the spectrometer.

86. The method of claim 85, comprising positioning a third end of the reflectance fiber coupler adjacent to a sample.

87. The method of claim 86, at least one of emitting light for illuminating the sample and collecting light reflected from the sample via the third end of the reflectance fiber coupler.

* * * * *